(12) United States Patent
Baek (10) Patent No.: US 8,986,867 B2
(45) Date of Patent: Mar. 24, 2015

(54) BATTERY PACK WITH ASSEMBLED LIGHT EMITTING PORTION

(75) Inventor: Moo-Ryong Baek, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 192 days.

(21) Appl. No.: 13/102,990

(22) Filed: May 6, 2011

(65) Prior Publication Data

US 2012/0121953 A1 May 17, 2012

(30) Foreign Application Priority Data

Nov. 11, 2010 (KR) .................. 10-2010-0112079

(51) Int. Cl.
*H01M 10/48* (2006.01)
*H01M 2/02* (2006.01)

(52) U.S. Cl.
CPC .......... *H01M 10/488* (2013.01); *H01M 2/0207* (2013.01)
USPC .............................. 429/90; 429/162; 429/163

(58) Field of Classification Search
CPC .... Y02E 60/12; H01M 10/488; H01M 10/42; F21V 15/00; F21L 2/00
USPC ........................................................ 362/612
See application file for complete search history.

(56) References Cited

U.S. PATENT DOCUMENTS

| | | | |
|---|---|---|---|
| 5,206,097 A * | 4/1993 | Burns et al. ..................... | 429/90 |
| 2003/0082441 A1* | 5/2003 | Hovi et al. ..................... | 429/123 |
| 2008/0118825 A1 | 5/2008 | Yoon | |
| 2008/0193829 A1* | 8/2008 | Lu ................................. | 429/100 |
| 2009/0027218 A1* | 1/2009 | Yoo ............................. | 340/636.1 |
| 2010/0090847 A1* | 4/2010 | Hendren et al. ........... | 340/636.1 |

FOREIGN PATENT DOCUMENTS

| | | | | |
|---|---|---|---|---|
| JP | 2005-123136 | * | 5/2005 | ............. H01M 2/10 |
| KR | 10-2004-0062914 A | | 7/2004 | |
| KR | 2005-0102315 | | 10/2005 | |
| KR | 10-2007-0022888 A | | 2/2007 | |
| KR | 10-0705650 | * | 2/2007 | ............. H04B 1/38 |
| KR | 2009-0030818 | | 3/2009 | |

* cited by examiner

*Primary Examiner* — Ula C. Ruddock
*Assistant Examiner* — Lisa S Park Gehrke
(74) *Attorney, Agent, or Firm* — Knobbe Martens Olson & Bear LLP (57) ABSTRACT

A battery pack assembly comprises at least one light emitting device, a switch for operating the light emitting devices, a case, and a battery pack. The battery pack assembly includes a support portion, an elastic connection portion, a button and an observation portion. The support portion is fixed to an inside of the case. The elastic connection portion is extended from one side of the support portion. The button is formed at an end portion of the elastic connection portion. The observation portion is fixed between the support portion and the case, and is configured to allow light emitted from the light emitting devices to pass therethrough. In the battery pack assembly, the button is exposed through the button hole, and light passing through the observation portion is exposed through the observation holes.

19 Claims, 7 Drawing Sheets

BATTERY PACK WITH ASSEMBLED LIGHT EMITTING PORTION

RELATED APPLICATIONS

This application claims priority to and the benefit of Korean Patent Application No. 10-2010-0112079, filed on Nov. 11, 2010, in the Korean Intellectual Property Office, the entire content of which is incorporated herein by reference.

BACKGROUND

1. Field

An aspect of the present invention relates to a battery pack with an assembled light emitting portion, and more particularly, to a battery pack assembly having a structure in which a light emitting portion is provided without a separate process such as welding.

2. Description of the Related Technology

A lithium-ion secondary battery may include a core pack provided with a bare cell and a protection circuit module.

The bare cell includes a positive electrode plate, a negative electrode plate and a separator. The bare cell supplies electric power to an external electronic device, and is rechargeable. The protection circuit module protects the secondary battery from over-charge and over-current and prevents the performance of the secondary battery from being degraded due to the over-charge.

As the safety of the secondary battery has become problematic, the function of the protection circuit module has become more important. Accordingly, a light emitting indicator such as an LED is provided to a secondary battery pack. The light emitting indicator (hereinafter, a configuration for fixing a light emitting device such as an LED is referred to as a 'light emitting portion') displays the operation of the protection circuit module, the state of the secondary battery, and the like.

Various studies have been conducted to reduce costs and to simplify processes in assembling the light emitting portion with the secondary battery.

SUMMARY

Embodiments provide a battery pack with a light emitting portion, which can reduce cost by simplifying manufacturing processes and reducing the failure rate by removing unnecessary processes.

According to an aspect of the present invention, a battery pack assembly comprises at least one light emitting device, a switch for operating the light emitting devices, a case, and a battery pack. The battery pack assembly includes a support portion, an elastic connection portion, a button and an observation portion.

The support portion is fixed to an inside of the case. The elastic connection portion is extended from one side of the support portion. The button is formed at an end portion of the elastic connection portion. The observation portion is fixed between the support portion and the case, and allows light emitted from the light emitting devices to pass therethrough. In the battery pack assembly a button hole through which the button is exposed and observation holes through which light passing through the observation portion is exposed are formed in the case.

First fixing hooks that fix the support portion to the case may be formed on an inner wall of the case. The first fixing hooks may be formed to be inclined along a direction such that the support portion is inserted into the case.

Fixing grooves may be formed in the inner wall of the case, and fixing projections corresponding to the fixing grooves may be formed in the support portion.

First alignment projections protruded in a direction such that the support portion is inserted at a predetermined position of the case may be formed at one side of the case, and alignment grooves corresponding to the respective first alignment projections may be formed in the support portion. Second fixing hooks for fixing the support portion to the case may be integrally formed with the first alignment projections at end portions of the first alignment projections. Mounting portions on which the second fixing hooks formed are mounted may be formed in the alignment grooves of the support portion.

Anti-scattering partitions that partition the respective light emitting devices so that light emitted from adjacent light emitting devices are not interfered with each other may be formed in the support portion.

The observation portion may be formed of a transparent or translucent material.

The observation portion may be formed of a poly methyl methacrylate material.

Pressure portions that press at least two corners opposite to each other toward the case may be provided to the support portion.

Guide projections that guide the observation portion to be coupled to the support portion may be formed in the support portion, and guide grooves corresponding to the guide projections may be formed in the observation portion. The anti-scattering partitions may be integrally formed with the guide projections.

Third fixing hooks for fixing any one of the pressure portions may be formed in the observation portion. Mounting portions on which the third fixing hooks are mounted may be formed at positions corresponding to the third fixing hooks in the pressure portion.

Second alignment projections inserted into the observation holes formed in the case may be formed in the observation portion.

An elasticity control hole that has an elasticity that increases or decreases depending on the sectional area of the elasticity control hole may be formed at a central portion of the elastic connection portion.

As described above, according to embodiments of the present invention, a battery pack assembly for operating and observing LEDs is attached to an outer case, so that it is possible to decrease the number of processes and processing time as compared with conventional hot melting methods.

Also, a separate hot melting jig is unnecessary, and thermal deformation of the component itself is inhibited, so that unintentional failures do not occur.

Also, it is unnecessary to consider a space for performing a welding operation within a narrow space in the design of a battery case.

BRIEF DESCRIPTION OF THE DRAWINGS

The accompanying drawings, together with the specification, illustrate certain embodiments of the present invention.

DETAILED DESCRIPTION

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to another element or be indirectly connected to another element with one or more intervening elements interposed therebetween. Hereinafter, like reference numerals refer to like elements. When terms that indicate directions, such as top, bottom, left and right, are used without special notation, the terms indicate directions represented in the drawings. In the drawings, the thickness or size of layers are exaggerated for clarity and not necessarily drawn to scale.

Descriptions of battery packs according to embodiments of the present invention herein are generally focused on a button portion, an observation portion and a case. Description of certain components known in the art such as light emitting devices and switches for light emitting devices will not provided. Hereinafter, certain components that constitute the battery pack will be described in detail.

Figure 1:
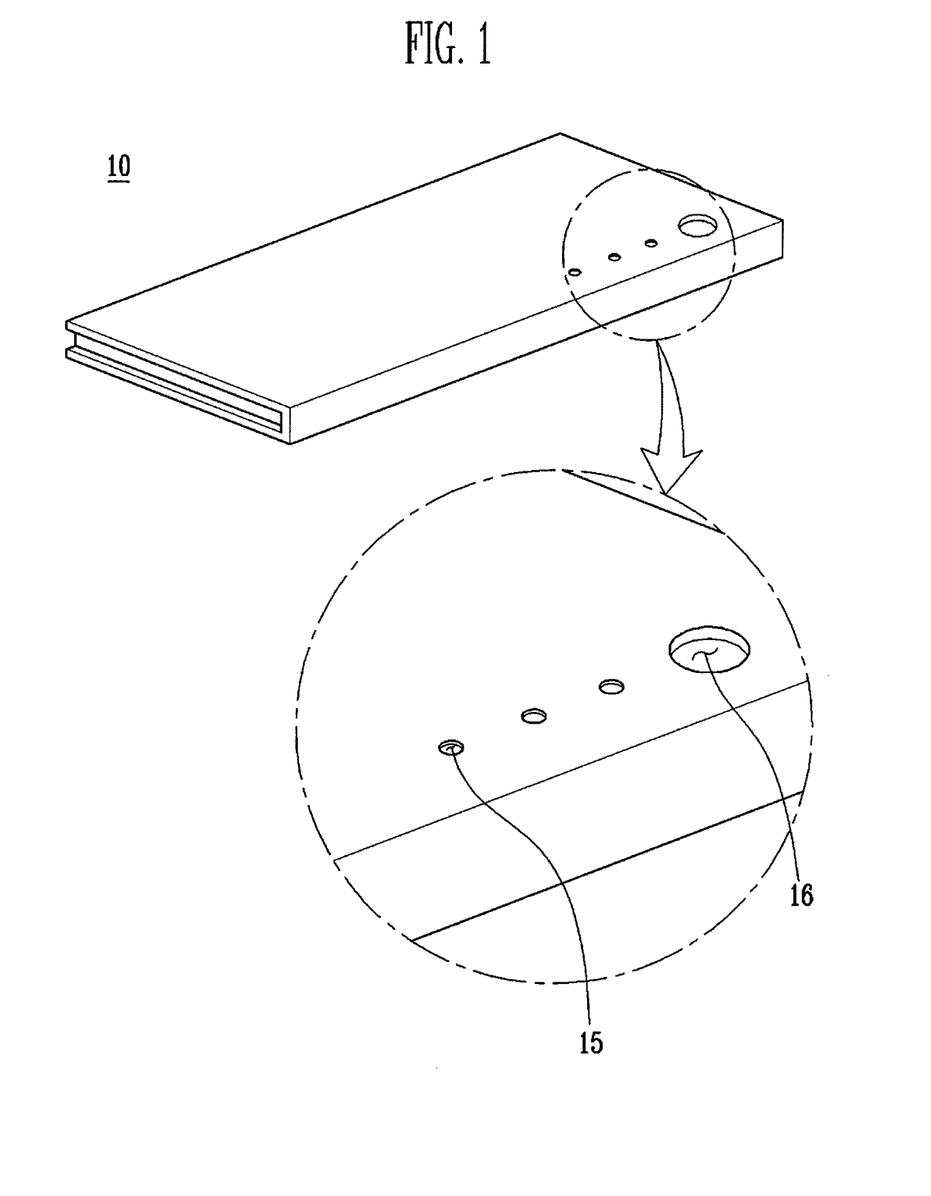
FIG. 1 is a partial perspective view showing an outer portion at which a light emitting portion is provided in a case of a battery pack according to an embodiment of the present invention.
Figure 2A:
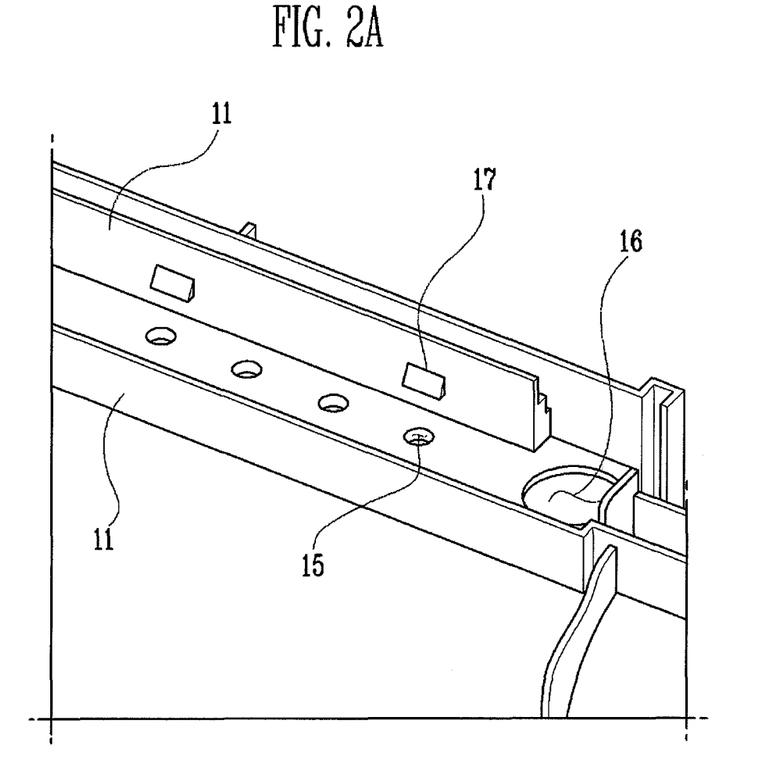
FIG. 2A is a partial perspective view showing an inside of the case of FIG. 1.
Figure 2B:
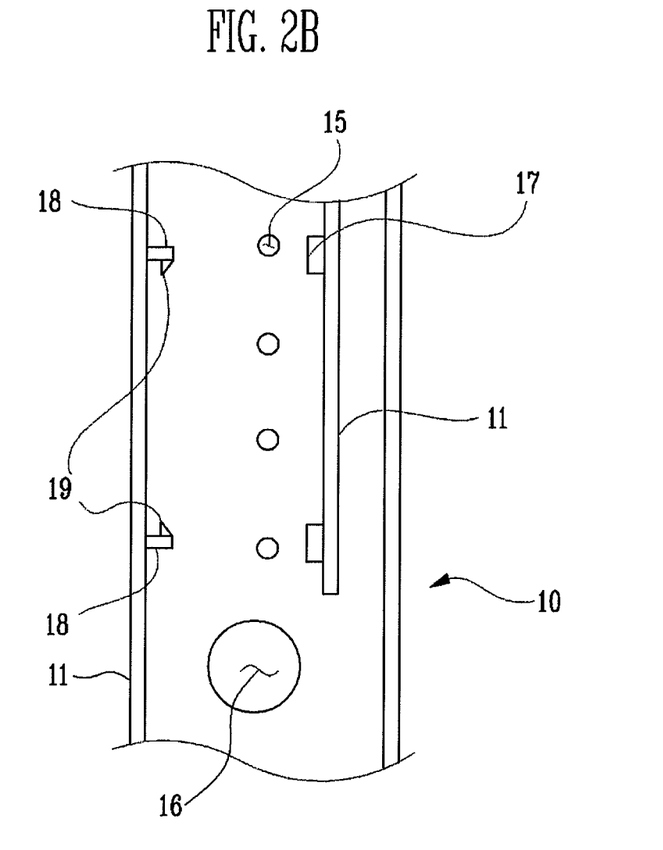
FIG. 2B is a partial plan view showing the inside of the case of FIG. 1.

A case 10 according to an embodiment of the present invention will be described with reference to FIGS. 1 to 2B. FIG. 1 is a partial perspective view showing an outer portion at which a light emitting portion is provided in the case of a battery pack according to the embodiment of the present invention. FIG. 2A is a partial perspective view showing an inside of the case of FIG. 1. FIG. 2B is a partial plan view showing the inside of the case of FIG. 1.

As shown in FIG. 1, a button hole 16 and an observation hole 15 are formed at an exterior of the case 10. Here, a button is exposed through the button hole 16, and light emitted from the light emitting devices (not shown) can be observed through the observation hole 15. In this instance, the observation hole 15 may be formed with a plurality of observation holes according to the amount of information to be observed.

A plurality of vertical walls 11 may be formed at the inside of the case 10 so that a button portion 20 (see FIG. 3A) an observation portion, which will be described later, can be fixed thereto. Various fixing portions may be formed at the inner surface of the case 10 and the vertical wall 11. A first fixing hook 17 shown in FIG. 2A and a first alignment projection 18 as shown in FIG. 2B may be formed as fixing portions.

The first fixing hook 17 functions to hold and fix a component formed in the shape of a hook to be inserted. The first fixing hook 17 may be formed on the vertical wall 11 or the inner surface of the case 10. The first fixing hook 17 may be formed to be inclined along the same direction of a component to be inserted, so that the component can be easily inserted and fixed. The detailed functions of the fixing portions will be described together with components respectively corresponding to the fixing portions.

In an embodiment where the first fixing hook 17 is formed on one vertical wall 11, the first alignment projection 18 may be formed on the other vertical wall 11 as shown in FIG. 2B. The first alignment projection 18 may be formed in the shape of a plate extended vertically to the vertical wall 11 and the inner surface of the case 10. In this instance, a second fixing hook 19 may be integrally formed with the first alignment projection 18 at an upper end of the first alignment projection 18. The functions of the first alignment projection 18 and the second fixing hook 19 will be described together with fixing portions respectively corresponding to the first alignment projection 18 and the second fixing hook 19.

Figure 3A:
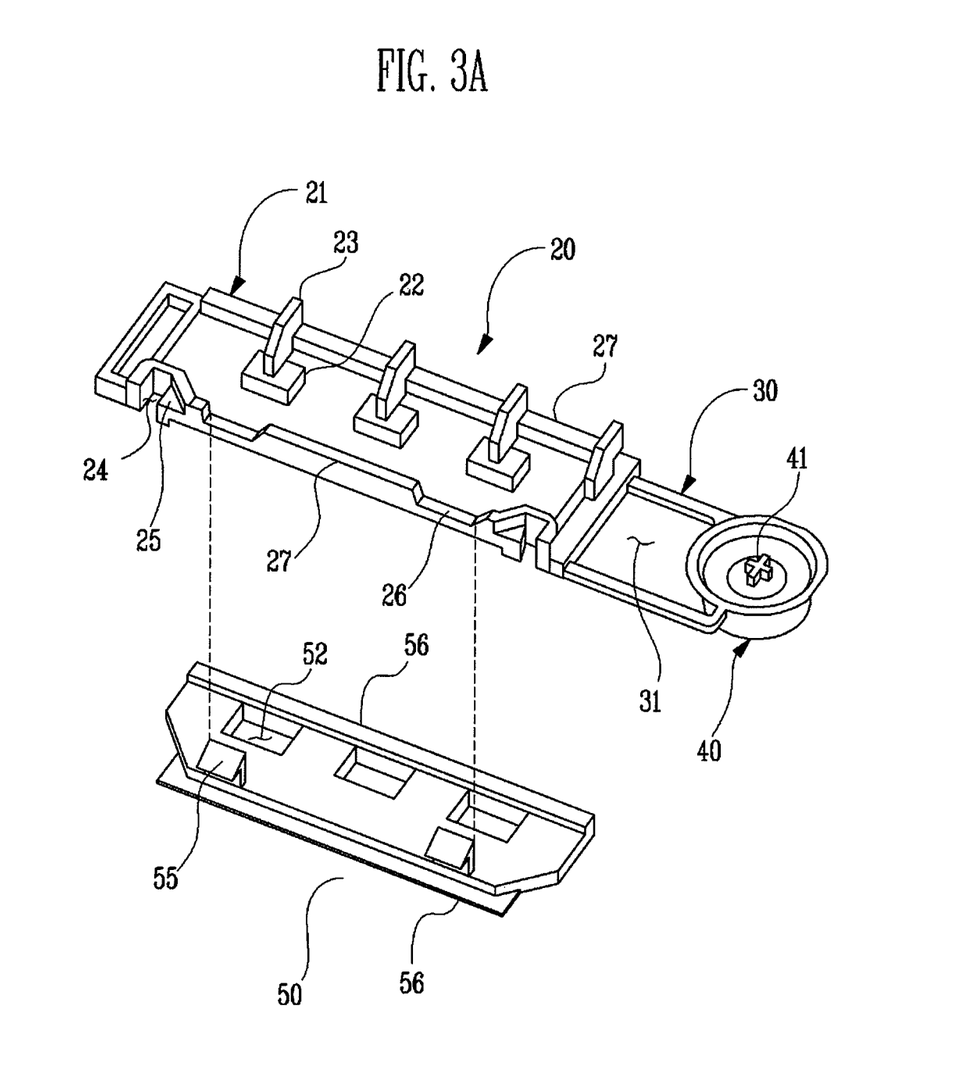
FIG. 3A is an exploded perspective view of a light emitting portion according to an embodiment of the present invention.
Figure 3B:
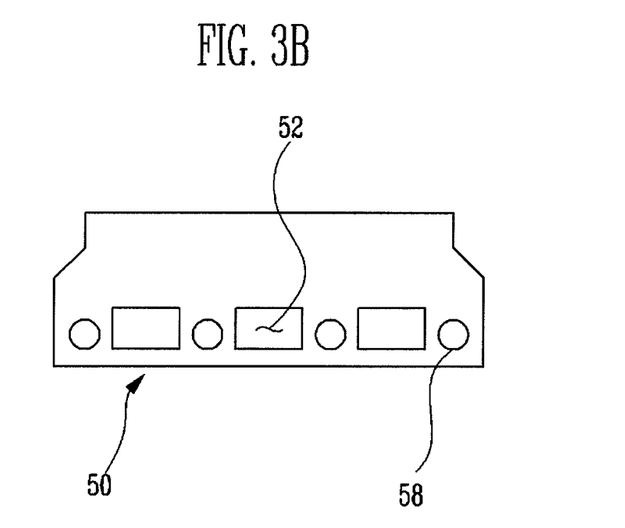
FIG. 3B is a bottom view of an observation portion according to an embodiment of the present invention.
Figure 3C:
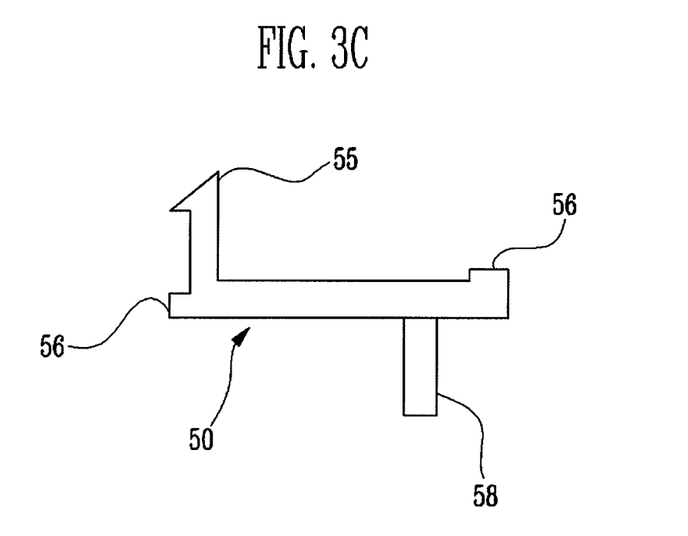
FIG. 3C is a side view of the observation portion according to an embodiment of the present invention.

A light emitting portion 20 and 50 according to an embodiment of the present invention will be described with reference to FIGS. 3A to 3C. FIG. 3A is an exploded perspective view of the light emitting portion according to the embodiment of the present invention. FIG. 3B is a bottom view of an observation portion according to the embodiment of the present invention. FIG. 3C is a side view of the observation portion according to the embodiment of the present invention. Meanwhile, the light emitting portion will be defined herein as including the button portion 20 and the observation portion 50.

As shown in FIG. 3A, the button portion 20 may be divided into a support portion 21, an elastic connection portion 30, a button 40 and various types of fixing portions.

The support portion 21 is a portion that fixes and supports the observation portion 50, which will be described later, toward the inner surface of the case 10. Pressure portions 27 that come in contact with the observation portion 50 to press the observation portion 50 in the direction of the case 10 may be formed in the support portion 21. The pressure portions 27 are formed to come in contact with at least two corners 56 opposite to each other among corners of the observation portion 50. A guide projection 22 that guides the observation portion 50 to be regularly coupled to the support portion 21 may be formed in the support portion 21. The guide projection 22 may be formed with at least two guide projections. Anti-scattering partitions 23 may be formed in the support portion 21. Here, the anti-scattering partitions 23 partition the respective light emitting devices (not shown) so that light emitted from adjacent light emitting devices (not shown) do not interfere with each other after the manufacturing process of the battery pack. As shown in FIG. 3A, the anti-scattering partition 23 may be integrally formed with the guide projection 22. That is, the anti-scattering partition 23 may be provided in the inside and top of the support portion, and the guide projection 22 may be formed at the bottom of the anti-scattering partition 23. In this instance, the anti-scattering partition 23 also functions to connect the guide projection 22 and the support portion 21.

A first alignment groove 24 corresponding to the first alignment projection 18 formed on the inner surface of the case 10 and/or the vertical wall 11 may be formed at one side of the support portion 21. The first alignment groove 24 may be formed to be vertically opened at the one side of the support portion 21. In the subsequent manufacturing process of the battery pack, the first alignment projection 18 (see FIG. 2B)

formed in the case 10 (see FIG. 2B) is inserted into the first alignment groove 24, so that the support portion 21 can be inserted into the case 10 at the correct position. A second-fixing-hook mounting groove 25 with a hook shape may be formed at an upper portion of the first alignment groove 24 so that the second fixing hook 19 (see FIG. 2B) can be mounted on the first alignment groove 24.

A third-fixing-hook mounting portion 26 may be formed in the other pressure portion 27 opposite to the pressure portion 27 at which the guide projections 22 are formed so that a hook-type fixing portion can be mounted on the other pressure portion 27. The third-fixing-hook mounting portion 26 may be formed to be stepped deeper than surroundings.

The elastic connection portion may be formed to be extended from one end of the support portion 21. In a case where the button 40, which will be described later, is pressed, the elastic connection portion 30 can allow the button 40 to be pressed with constant elasticity or to be restored to its original position. An elasticity control hole 31 of which elasticity increases or decreases depending on the sectional area thereof may be formed at the center of the elastic connection portion 30. That is, if the sectional area of the elasticity control hole 31 increases, the elasticity of the elastic connection portion 30 increases. If the sectional area of the elasticity control hole 31 decreases, the elasticity of the elastic connection portion decreases.

The button 40 may be formed at an end portion of the elastic connection portion 30. The button 40 is inserted into the button hole 16 of the case 10 to be exposed to the exterior of the case 10. A pressure projection 41 may be formed on the inside of the button 40. In a case where the button 40 is pressed by a user, the pressure projection 41 physically presses a switch for operating the light emitting devices (not shown) provided to the battery pack so that the switch is electrically turned on/off.

According to an embodiment, the observation portion 50 is interposed between the button portion 20 and the case 10 so that light emitted from the light emitting devices (not shown) is transmitted therethrough. Therefore, the observation portion 50 according to embodiments is formed of a transparent or translucent material. For example, the observation portion 50 may be formed of a poly methyl methacrylate material.

Guide grooves 52 corresponding to the respective guide projections 22 may be formed in the observation portion 50. That is, the guide grooves 52 may be formed to pass through the top and bottom of the observation portion 50. The number and positions of the guide grooves 52 may be formed to correspond to those of the guide projections 22. In the manufacturing process of the battery pack according to embodiments of the invention, the guide projections 22 are inserted into the respective guide grooves 22, so that the button portion 20 and the observation portion 50 can be coupled to each other. After the button portion 20 and the observation portion 50 are coupled to each other, they cannot be easily separated in some embodiments.

Third fixing hooks 55 that fix the pressure portion 27 may be formed in the observation portion 50. As shown in FIG. 3C, the third fixing hooks 55 are formed above any one of the two corners 56, pressed by the pressure portion 27. That is, the third fixing hooks 55 are fixed by hooking the upper end of the pressure portion 27. The third fixing hooks 55 prevents the button portion 20 and the observation portion 50 from being arbitrarily separated after the button portion 20 and the observation portion 50 are fixed to each other. As shown in FIGS. 3B and 3C, second alignment projections 58 are formed on a bottom surface of the observation portion 50. The second alignment projections 58 are formed to be extended downward from the bottom surface of the observation surface. The number of the second alignment projections 58 may be formed to be the same as that of the observation holes 15 (see FIG. 1) of the case 10 (see FIG. 1). In the manufacturing process of the battery pack according to embodiments of the invention, the second alignment projections 58 are inserted into the respective observation holes 15 of the case 10. Like the observation portion 50, the second alignment projections 58 may be formed of a transparent or translucent material so that light emitted from the light emitting devices (not shown) is transmitted therethrough.

Figure 4:
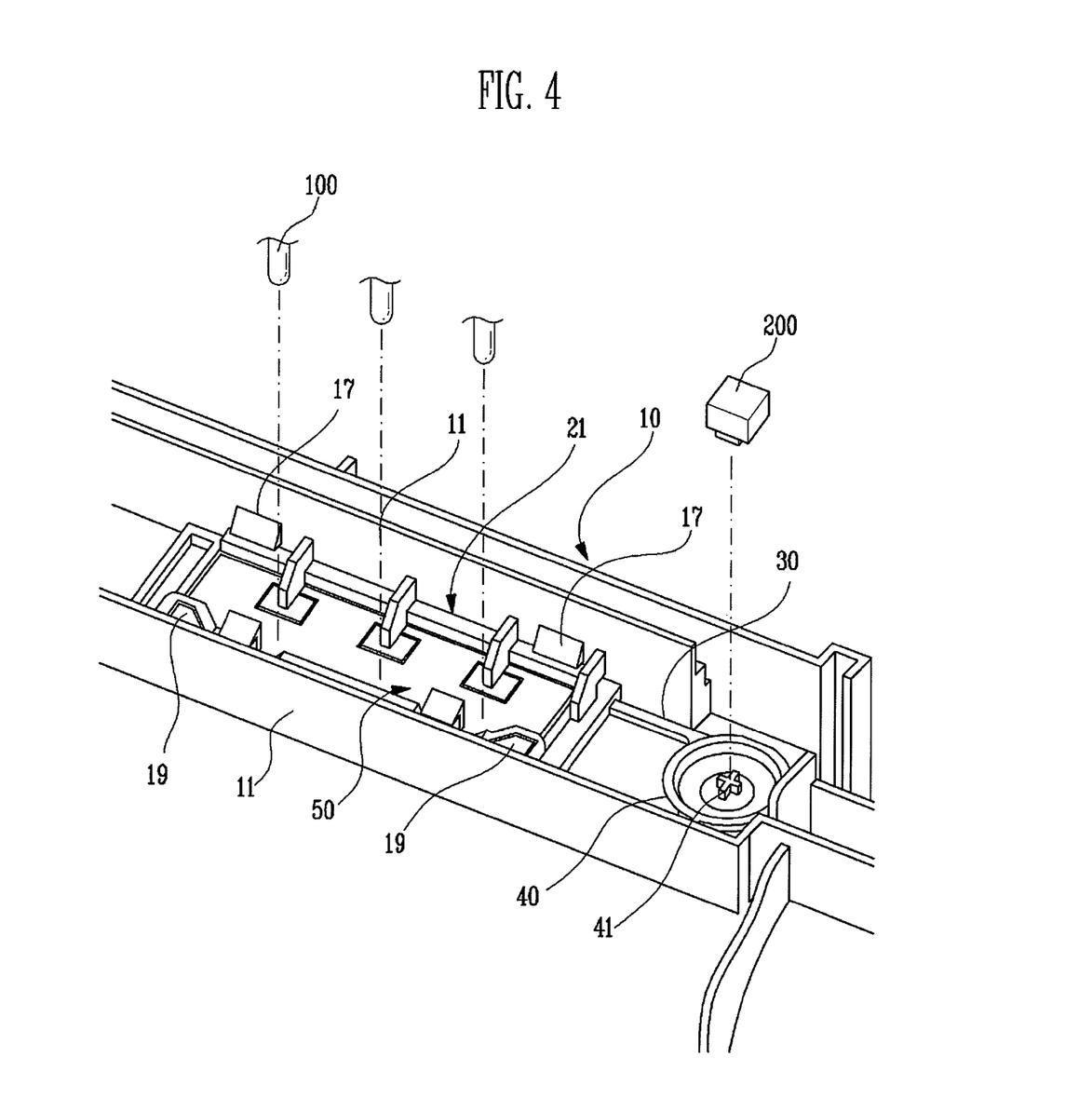
FIG. 4 is a partial perspective view showing an inside of the case in the state that the light emitting portion of FIG. 3A is assembled in the case.
Figure 5:
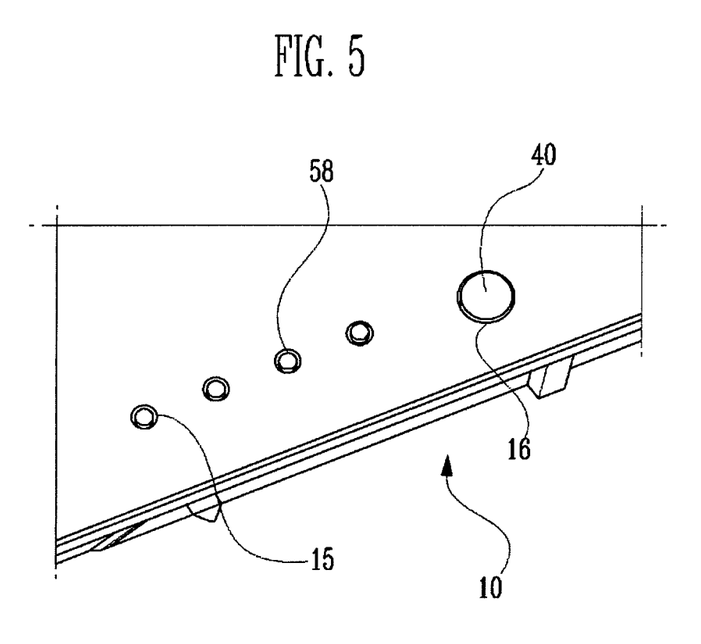
FIG. 5 is a partial perspective view showing an outside of the case in the state that the light emitting portion of FIG. 3A is assembled in the case.

The process and structure in which the observation portion 50 and the button portion 20 are assembled in the case 10 will be described with reference to FIGS. 4 and 5. FIG. 4 is a partial perspective view showing an inside of the case 10 in the state that the light emitting portion 20 and 50 of FIG. 3A is assembled in the case 10. FIG. 5 is a partial perspective view showing an outside of the case 10 in the state that the light emitting portion 20 and observation portion 50 of FIG. 3A are assembled in the case 10.

As described above, the observation portion 50 may be positioned between the button portion 20 and the case 10. As shown in FIG. 5, the alignment projections 58 of the observation portion 50 may be inserted into the respective observation holes 15 so that the observation portion 50 is fixed at the correct position. In this instance, the second alignment projections 58 may be exposed through the respective observation holes 15.

One side of the button portion 20 may be fixed by the first fixing hooks 17 formed on the inner surface of the case 10 or the vertical wall 11. The other side of the button portion 20 may be fixed by the second fixing hooks 19 described above.

As described in FIG. 5, the button 40 may be exposed to the exterior of the case 10 through the button hole 16. A user can press the exposed button 40 through the button hole 16, so that the light emitting devices (not shown) can be operated.

While the present invention has been described in connection with certain embodiments, it is to be understood that the invention is not limited to the disclosed embodiments, but is intended to cover various modifications and equivalent arrangements included within the spirit and scope of the appended claims, and equivalents thereof.

What is claimed is:

1. A battery pack assembly comprising:
   a battery pack;
   a plurality of light emitting devices;
   a switch for operating the plurality of light emitting devices;
   a case comprising a button hole and observation holes;
   a support portion having two sides fixed to an inside of the case wherein the support portion is secured to the case via first fixing hooks wherein the support portion defines an opening extending therethrough with an outer edge;
   an elastic connection portion extended from one side of the support portion;
   a button formed at an end portion of the elastic connection portion; and
   an observation portion having an outer periphery wherein the observation portion is fixed between the support portion and the case, wherein the observation portion is configured to allow light emitted from the plurality of light emitting devices to pass therethrough and wherein the observation portion defines a planar portion that is sized to be positioned inside the opening in the support portion wherein the observation portion is separate from the support portion and is secured to the support portion via second fixing hooks extending from the planar portion of the observation portion and engaging an outer edge of the support portion and wherein the planar portion of the observation portion is formed entirely out of a transparent or translucent material such that the light passes through the body of the planar portion and is sized to permit light to pass from each the plurality of light emitting devices to the observation holes in the case, and wherein the button is exposed through the button hole, and light passing through the observation portion is exposed through the observation holes and wherein the observation portion is maintained within the opening of the support portion via the second fixing hooks so as to extend entirely through the support portion so as to be exposed on both sides of the support portion and wherein the support portion is separate from the case and is maintained within the case via the first fixing hooks.

2. The battery pack assembly according to claim 1, wherein the first fixing hooks are formed on an inner wall of the case.

3. The battery pack assembly according to claim 2, wherein the first fixing hooks are inclined such that the support portion is inserted into the case.

4. The battery pack assembly according to claim 1, wherein fixing grooves are formed in an inner wall of the case, and fixing projections corresponding to the fixing grooves are formed in the support portion.

5. The battery pack assembly according to claim 1, wherein the case comprises first alignment projections protruded in a direction such that the support portion is inserted at a predetermined position of the case by alignment grooves formed in the support portion corresponding to the first alignment projections.

6. The battery pack assembly according to claim 5, wherein third fixing hooks for fixing the support portion to the case are integrally formed with the first alignment projections at end portions of the first alignment projections.

7. The battery pack assembly according to claim 6, wherein the support portion comprises mounting portions formed in the alignment grooves on which the third fixing hooks are mounted.

8. The battery pack assembly according to claim 1, wherein the support portion further comprises anti-scattering partitions that partition the light emitting devices so that light emitted from adjacent light emitting devices do not interfere with each other.

9. The battery pack assembly according to claim 1, wherein the observation portion is formed of a transparent or translucent material.

10. The battery pack assembly according to claim 1, wherein the observation portion is formed of a poly methyl methacrylate material.

11. The battery pack assembly according to claim 1, wherein the support portion further comprises pressure portions that press at least two opposing corners of the support portion toward the case.

12. The battery pack assembly according to claim 11, wherein the support portion further comprises guide projections that guide the observation portion to be coupled to the support portion, and the observation portion further comprises guide grooves corresponding to the guide projections.

13. The battery pack assembly according to claim 12, wherein the anti-scattering partitions are integrally formed with the guide projections.

14. The battery pack assembly according to claim 11, wherein the second fixing hooks fix any one of the pressure portions.

15. The battery pack assembly according to claim 14, wherein the pressure portion comprises mounting portions on which the second fixing hooks are mounted, at positions corresponding to the second fixing hooks.

16. The battery pack assembly according to claim 1, wherein the observation portion comprises second alignment projections inserted into the observation holes formed in the case.

17. A battery pack assembly comprising:
a battery pack;
a light emitting portion comprising:
 a plurality of light emitting devices,
 a support portion having two sides that includes a button portion comprising a button for operating the plurality of light emitting devices wherein the support portion defines an opening extending therethrough and an edge, and
 an observation portion having an outer periphery wherein the observation portion is separate from the support portion and secured thereto via fixing hooks configured to allow light emitted from the plurality of light emitting devices to pass therethrough wherein the observation portion defines a planar portion that is sized to be positioned inside the opening in the support portion that extends entirely through the support portion so as to be exposed on both sides of the support portion wherein the observation portion is secured to the support portion via the fixing hooks extending from the planar portion of the observation portion and engaging an outer edge of the support portion and wherein the planar portion of the observation portion is formed entirely out of a transparent or translucent material such that the light passes through the body of the planar portion and is sized to permit light to pass from each the plurality of light emitting devices to the observation holes in the case; and
a case for enclosing the battery pack and the light emitting portion wherein the support portion is separate from the case and is secured to the case via fixing hooks.

18. The battery pack assembly of claim 17, wherein the button portion further comprises a support portion coupling the light emitting portion to an inside of the case.

19. The battery pack assembly of claim 17, wherein the case comprises a button hole and observation holes, and wherein the button is exposed through the button hole, and light from the plurality of light emitting devices is exposed through the observation holes.

* * * * *